Oct. 5, 1971   HANS-RUDOLF JACOBI ET AL   3,609,808

EXTRUSION DIE

Filed Dec. 3, 1969   2 Sheets-Sheet 1

A-B

INVENTORS:
HANS-RUDOLF JACOBI
HANS EISENHARDT
HORST HOYER
BY
Johnston, Root, O'Keeffe, Keil, Thompson & Shurtleff
ATT'YS

United States Patent Office 3,609,808
Patented Oct. 5, 1971

3,609,808
EXTRUSION DIE
Hans-Rudolf Jacobi and Hans Eisenhardt, Mannheim, and Horst Hoyer, Ludwigshafen, Germany, assignors to Badische Anilin- & Soda-Fabrik Aktiengesellschaft, Ludwigshafen, Rhineland, Germany
Filed Dec. 3, 1969, Ser. No. 881,736
Claims priority, application Germany, Dec. 6, 1968,
P 18 13 010.4
Int. Cl. B29f 3/04
U.S. Cl. 18—12 DM    4 Claims

ABSTRACT OF THE DISCLOSURE

An extrusion die for feeding a compressed plastics melt into a zone of low pressure for the purpose of degassing which consists of a plurality of tubular dies arranged coaxially about a central pin, the said tubular dies being fitted into one another and being supported by one another, by the central pin and by the die casing via supporting means located in annular grooves in the tubular dies.

---

The invention relates to an extrusion die for feeding a compressed plastics melt into a zone of low pressure for the purpose of degassing the plastics melt.

In processing a thermoplastic in an extruder it is often necessary to free the plastics melt from gaseous components such as residual amounts of monomers, moisture or low boiling point plasticizers prior to further processing, for example prior to introduction into an injection mold. For this purpose the compressed plastics melt is conveyed through a zone of low pressure, for example a vacuum chamber, the high vapor pressure of the volatile components caused by the high temperature of the melt facilitating the degassing. Since however only the free surface of the plastics melt can be degassed direct, while the remainder of the melt can only give up its volatile constituents by diffusion which proceeds very slowly, it is important for effective degassing that the extruded melt in the degassing zone should have the largest possible free surface.

It is known that a plastics melt which has been compressed in an extruder can be supplied to the degassing zone through a tubular die in the form of thin-walled tubing. The tubular die may have a fixed or variable gap width. Since the plastics melt in the degassing zone should have the largest possible free surface, the plastics melt has to be fed into the degassing zone in the smallest possible thickness. A disadvantage is that, when the cross-section of the die is small, the speed of discharge reaches very high values so that the large surface of the melt achieved is accessible for removing the volatile constituents for a relatively short time only.

It is an object of this invention to provide an extrusion die which produces a large free surface for degassing of the melt at a fairly low speed of discharge from the die and consequently a long residence time of the plastics melt in the region of the degassing zone.

This objection is achieved, in the feeding of a compressed plastics melt into a zone of lower pressure for the purpose of degassing by means of an extrusion die, by providing in accordance with this invention in the flow channel for the plastics melt a plurality of tubular dies fitted one into the other, surrounded by a supporting ring secured to the casing of the flow channel, and arranged coaxially around a central pin for the provision of annular gaps, the tubular dies, the central pin and the supporting ring being provided in the region of the annular gaps with annular grooves and the tubular dies being supported with respect to each other, with respect to the central pin and with respect to the supporting ring by means of supporting means arranged in the annular grooves and introduced by way of closable widenings directed toward the outlet ends of the dies and provided in the annular grooves, at least one such widening being provided for each groove. The supporting means may consist of balls. The widenings in the annular grooves serving for introducing the supporting means are closed at the die outlet ends by means of closure members which are fixed in their position by means of a strap detachably secured to the casing of the flow channel. When the tubular dies have to absorb large compressive forces by reason of a large cross-sectional area or a high pressure in the plastics melt, it is advisable to attach the central pin at one end to the casing of the flow channel.

Apparatus in accordance with the invention is illustrated by way of example in the drawing and is hereinafter described in detail.

For the sake of clarity the degassing pipe with the degassing means attached to the extrusion die is not shown.

Figure 2:
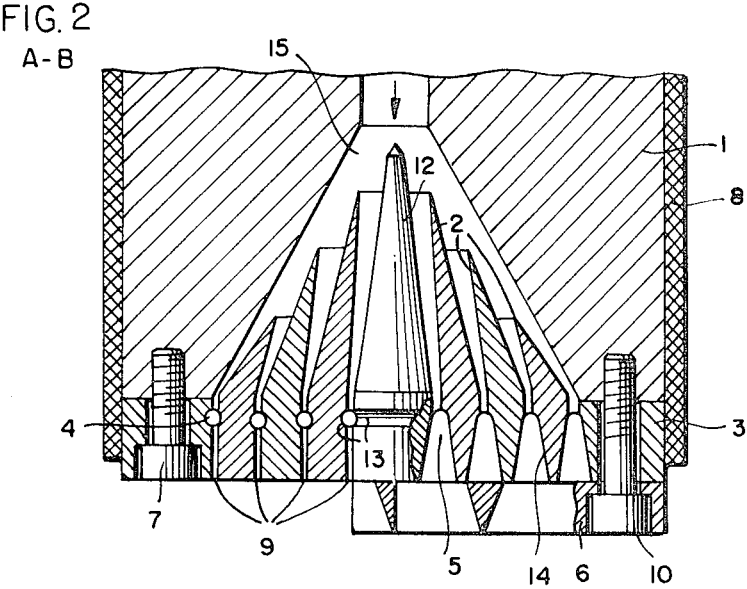
FIG. 2 is a longitudinal section of the extrusion die according to the invention.
Figure 1:
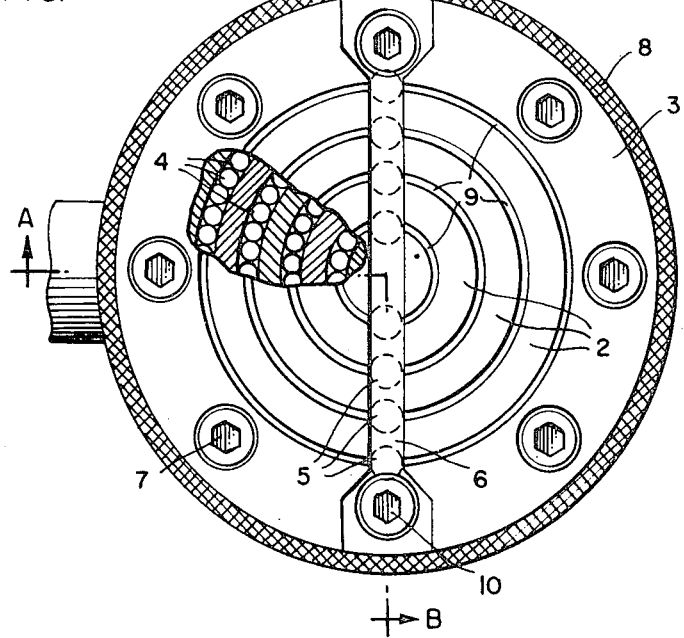
FIG. 1 is a plan of the outlet end of the extrusion die according to the invention.
Figure 3:
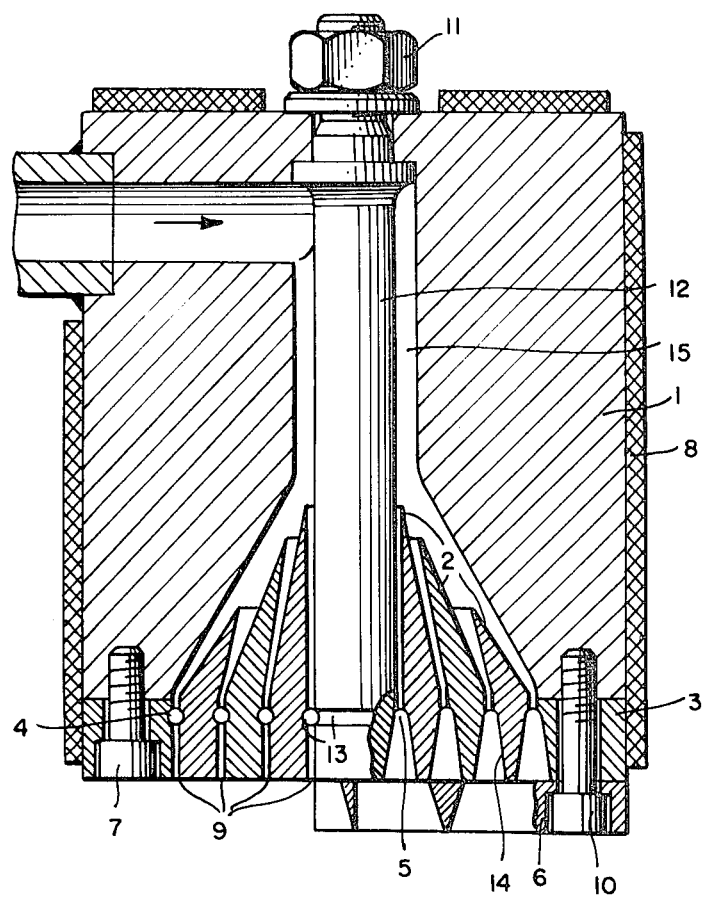
FIG. 3 is another embodiment of extrusion die in longitudinal section and having a central pin supported in the casing of the flow channel.

According to FIGS. 1 to 3, three tubular dies 2 fitted one into the other are provided coaxially about a central pin 12 in the casing 1 of a flow channel 15 for the plastics melt in such a way that four annular gaps 9 are formed between the inner tubular die and the central pin 12, between the tubular dies 2 and between the outer tubular die and a supporting ring 3 attached to the casing 1 of the flow channel 15. The tubular dies 2, the central pin 12 and the supporting ring 3 are provided in the region of the annular gaps 9 with annular grooves 13 which serve to receive balls 4 used as supporting means. The supporting ring 3 (which by means of the balls 4 supports the tubular dies 2 and the central pin 12) is secured by screws 7 to the casing 1 of the flow channel. The balls are introduced into the annular grooves 13 through widenings 14 directed from the annular grooves 13 towards the outlet ends of the dies. In the example shown in the drawing, each annular groove is provided with two such widenings arranged on the line of a diameter of the dies. After the balls 4 serving as supporting means have been introduced into the annular grooves 13, the widenings 14 are closed with closure cones 5 which are held in position by means of a strap 6 secured by screws 10 to the casing 1. The extrusion die may be provided with an external heating jacket 8.

The embodiment shown in FIG. 3 differs from the embodiment shown in FIG. 1 only in the fact that the central pin 12 is used as a supporting means for the tubular dies 2 in addition to the supporting ring and for this purpose is anchored at one end to the casing 1 by means of a screwed nut 11. The use of such an embodiment is advisable when the compressive forces exerted on the tubular dies by the plastics melt flowing in the casing 1 are so great that they can no longer be absorbed by the supporting ring alone.

The plastics melt which is forced through the flow channel of the casing 1 is broken up by the tubular dies 2 and the central pin 12 into a plurality of partial streams and after passing through the annular grooves filled with steel balls 4 flows to the outlet ends of the dies. Since the widenings 14 of the annular grooves 13 are closed on the die outlet side by closure cones 5, which are held by a strap 6 secured to the casing 1, the flow of the melt into the degassing chamber attached to the extrusion die (and not shown in the drawing) is interrupted at these points. The plastics melt therefore issues in the form of concentric, lengthwise slit tubular films into the degassing chamber and the volatile constituents can be sucked away from a free surface of the melt amounting to the sum of the inside and outside surfaces of the slit tubing.

The advantages of the extrusion die according to the invention over conventional dies having only one slot are particularly evident in the fact that instead of a one-slot die there can be provided within the same space several tubular dies which, with the same slot width as that of conventional one-slot dies, can produce, for degassing of the melt, a free surface which is increased by a multiple. Since the total cross-section of the annular gaps available for passage of the melt is very much larger than the cross-section of the slot of a comparable one-slot die, the speed of discharge of the melt from the die is greatly decreased for the same film thickness, and the residence time of the melt in the degassing zone is correspondingly lengthened. In this way it is ensured that the volatile constituents of the plastics melt have adequate time for separating from the melt before this leaves the degassing zone.

We claim:

1. An extrusion die for feeding a compressed plastics melt into a zone of lower pressure for the purpose of degassing, comprising a flow channel casing, a plurality of tubular dies (a) located in the flow channel for the plastics melt, (b) arranged coaxially around a central pin to provide a plurality of annular gaps, (c) fitted one into another and (d) surrounded by a supporting ring secured to the casing of the flow channel; the tubular dies, the central pin and the supporting ring being provided in the region of the annular gaps with annular grooves and the tubular dies being supported with respect to each other, with respect to the central pin and with respect to the supporting ring by supporting means arranged in the annular grooves and introduced by way of closable widenings directed toward the outlet ends of the dies and provided in the annular grooves, at least one such widening being provided for each groove.

2. An extrusion die as claimed in claim 1 wherein the supporting means are balls.

3. An extrusion die as claimed in claim 1 wherein the widenings of the annular grooves serving for the introduction of the supporting means are closed at the die outlet ends by means of closure members which are fixed in position by a strap which is detachably secured to the casing of the flow channel.

4. An extrusion die as claimed in claim 1 wherein the central pin is secured at one end to the casing of the flow channel.

References Cited

UNITED STATES PATENTS

| 2,753,596 | 7/1956 | Bailey | 18—14P UX |
| 2,944,287 | 7/1960 | Moran | 18—14 GX |
| 3,150,413 | 9/1964 | Zeitlin et al. | 18—DIG26 |
| 3,221,372 | 12/1965 | Lieberman | 18—14 P |

J. SPENCER OVERHOLSER, Primary Examiner

M. O. SUTTON, Assistant Examiner

U.S. Cl. X.R.

18—14 R; 308—183